United States Patent [19]

Sato et al.

[11] Patent Number: 5,178,946
[45] Date of Patent: Jan. 12, 1993

[54] RESIN LAMINATES

[75] Inventors: Hiroyuki Sato; Tetsuji Kakizaki, both of Yokkaichi, Japan

[73] Assignee: Mitsubishi Pretrochemical Company Limited, Tokyo, Japan

[21] Appl. No.: 677,480

[22] Filed: Mar. 29, 1991

[30] Foreign Application Priority Data

| Mar. 30, 1990 | [JP] | Japan | 2-83975 |
| Mar. 30, 1990 | [JP] | Japan | 2-83976 |
| Mar. 30, 1990 | [JP] | Japan | 2-83977 |
| Aug. 6, 1990 | [JP] | Japan | 2-206792 |
| Aug. 8, 1990 | [JP] | Japan | 2-208222 |

[51] Int. Cl.$^5$ .............................. B32B 27/36
[52] U.S. Cl. .................. 428/412; 428/421; 428/458; 428/461; 428/463; 428/483
[58] Field of Search ............... 428/520, 522, 412, 483, 428/518, 421, 458, 461, 463

[56] References Cited

U.S. PATENT DOCUMENTS 4,588,642  5/1986  Ochiumi .................. 428/421

FOREIGN PATENT DOCUMENTS 0133243  2/1985  European Pat. Off. .

Primary Examiner—Edith Buffalow
Attorney, Agent, or Firm—Wegner, Cantor, Mueller & Player

[57] ABSTRACT

A resin laminate containing: a layer (Layer A) of a modified ethylene/vinyl acetate copolymer resin obtained by the graft copolymerization of a vinyl acetate monomer onto an ethylene/vinyl acetate copolymer having a vinyl acetate content of 5–50% by weight, the modified ethylene/vinyl acetate copolymer resin having an MFR of 0.5 to 30 g/10 min. and a total vinyl acetate content of 20–80% by weight; and a layer (Layer B) of at least one thermoplastic resin selected from a styrene resin, an acrylic resin, a chlorine-containing resin, a polycarbonate resin and a thermoplastic polyester resin.

9 Claims, No Drawings

RESIN LAMINATES

BACKGROUND OF THE INVENTION

1. Field of the Invention

This invention relates to a resin laminate comprising a layer of a specific modified ethylene/vinyl acetate copolymer resin and a layer of a selected specific thermoplastic resin.

2. Background Art

Having the properties of being stable to heat, excelling in moldability and processability and being of low hygroscopicity, tasteless/odorless and chemically inert, styrene resins have so far been widely used for food containers, packaging materials, goods such as toys and writing utensils, parts of cars or electric appliances for home service, etc.

However, they have the disadvantages of being likely to be attacked by organic solvents, fragile and of insufficient heat resistance. For use as food containers in particular, resins having improved oil resistance, heat resistance and heat sealability are thus in great demand. In order to meet such demand, it has been attempted to laminate polyolefins such as polyethylene and polypropylene or other materials on styrene resins.

However, adhesives capable of making an effective bonding of such styrene resins to polyolefins or other materials are still unavailable. Referring to laminates of styrene resins with ethylene/vinyl acetate copolymer resins, by way of example, it has been attempted to introduce into them a larger amount of vinyl acetate in the form of a copolymer with ethylene in expectation of improvements in their adhesion. An increase in the vinyl acetate unit content of said copolymer, however, rather incurs a drop of its mechanical strength, thus failing to achieve a sufficient improvement in adhesion strength.

Laminates of styrene resins with polyolefins modified by grafting α,β-unsaturated carboxylic acids onto them or containing epoxy groups, ordinarily known as adhesive polyolefins, have also been available; however, they are found to be less than satisfactory in terms of adhesion performance.

Acrylic resins, on the other hand, excel in various properties such as transparency, weather resistance, chemical resistance and electrical insulating quality and are light in weight, tough and of good processability, and so have been widely used as various molding and coating materials.

However, such acrylic resins, esp. methacrylic resins have the disadvantages of being more likely to be injured and more combustible than a competitive inorganic glass. The acrylic resins are also required to have more enhanced heat resistance and impact resistance for use as molding materials.

As one means for meeting such demands, the lamination of acrylic resins with polyolefins such as polyethylene and polypropylene or with other materials is considered effective.

Various adhesive resins have been proposed to bond acrylic resins to other materials. By way of example, ethylene/vinyl acetate copolymer resins having a relatively high vinyl acetate content may be mentioned.

However, the adhesion between acrylic resins and the copolymer resins is still far from satisfactory. In expectation of improvements in such adhesion, the introduction of a larger amount of vinyl acetate in the form of a copolymer with ethylene has been attempted.

However, it has been found that the copolymerization of too large an amount of vinyl acetate rather incurs a drop of the mechanical strength of the resulting copolymer, thus failing to achieve appreciable improvements in adhesion strength.

Furthermore, chlorine-containing resins such as vinyl and vinylidene chloride resins have been available.

Generally excelling in various properties such as resistance to solvents, water, acids and alkalis and flame retardancy, vinyl chloride resins have so far been used in wide applications inclusive of films, wire coatings, floor materials, pipings and sheetings. Generally excelling in moistureproofness and gas barrier properties, vinylidene resins have found wide applications in various packaging films and coating moistureproof materials.

However, both the resins are relatively prone to degrade by heat and light and are too hard, and so should be used in combination with suitable stabilizers or plasticizers. In particular, a soft vinyl chloride resin has the disadvantages of being poor in cold resistance, oil resistance and creep resistance due to the plasticizer content being as high as about 30–40%. To make up for such disadvantages, the lamination of these resins with polyolefins such as polyethylene and polypropylene or with other materials is considered effective.

Various adhesive resins have been proposed so as to bond vinyl chloride resins or vinylidene chloride resins to other materials. An ethylene/vinyl acetate copolymer resin having a relatively high vinyl acetate content is one example.

However, the adhesion of vinyl chloride resins or vinylidene chloride resins to such an ethylene/vinyl acetate copolymer resin is still less than satisfactory. In expectation of improvements in this adhesion, the introduction of a larger amount of vinyl acetate in the form of an α-copolymer with ethylene has been attempted. However, the copolymerization of too large an amount of vinyl acetate rather incurs a drop of the mechanical strength of the resulting copolymer, thus failing to achieve appreciable improvements in the adhesion strength.

Polycarbonate resins are superior in such properties as heat resistance and mechanical strength, but practically is less than satisfactory in terms of chemical resistance and oxygen barrier properties.

In order to eliminate the disadvantages of such resins while making the best use of their advantages, it has been attempted to laminate on them resins having complementary properties, e.g. a polyolefin excelling in chemical resistance or a saponified ethylene/vinyl acetate copolymer excelling in oxygen barrier properties.

In particular, intensive studies have been made in fields of co-extrusion molding and co-injection molding capable of producing laminated structures efficiently and subsequent stretching.

However, any bonding agent to provide an effective bonding of polycarbonate resins to polyolefins or other materials is not developed as yet. Referring to the lamination of polycarbonate resins and ethylene/vinyl acetate copolymers, by way of example, the introduction of a large amount of vinyl acetate in the form of a copolymer with ethylene in expectation of improvements in adhesion rather gives rise to a drop of the mechanical strength of the resulting copolymers, thus failing to achieve appreciable improvements in adhesion strength.

Furthermore, the capability of polyolefins modified by grafting α,β-unsaturated carboxylic acids onto them or containing epoxy groups—usually known as adhesive polyolefins—to bond to polycarbonate resins is less than satisfactory.

Thermoplastic polyester resins are superior in such properties as heat resistance and mechanical strength, but practically are far from satisfactory in terms of heat sealability and gas permeability.

In order to eliminate the disadvantage of such resins while making the best use of their advantages, it has been attempted to laminate on them resins having complementary properties, e.g. a polyolefin excelling in heat sealability or a saponified ethylene/vinyl acetate copolymer excelling in gas permeability.

In particular, intensive studies have been made in fields of co-extrusion molding and co-injection molding capable of producing laminated structures efficiently and subsequent stretching.

However, any bonding agent to provide an effective bonding of thermoplastic polyesters to polyolefins or other materials is not developed as yet. Referring to the lamination of a polyester and an ethylene/vinyl acetate copolymer, by way of example, the introduction of a large amount of vinyl acetate in the form of a copolymer with ethylene in expectation of improvements in adhesion rather gives rise to a drop of the mechanical strength of the resulting copolymer, thus failing to achieve appreciable improvements in adhesion strength.

Furthermore, the capability of polyolefins modified by grafting α,β-unsaturated carboxylic acids onto them or containing epoxy groups—usually known as adhesive polyolefins—to bond to thermoplastic polyester is less than satisfactory.

SUMMARY OF THE INVENTION

It is, therefore, an object of this invention to eliminate such disadvantages as found in the above specific resins when they are laminated and bonded together with other resins. According to the present invention, this object is achieved by using a specific modified copolymer so as to improve adhesion remarkably.

Thus, the resin laminate according to the present invention comprises a layer (Layer A) of a modified ethylene/vinyl acetate copolymer resin obtained by the graft copolymerization of a vinyl acetate onto an ethylene/vinyl acetate copolymer having a vinyl acetate content of 5-50% by weight, said modified ethylene/vinyl acetate copolymer resin having an MFR of 0.5-30 g/10 min. and a total vinyl acetate content of 20-80% by weight, and a layer (Layer B) of at least one thermoplastic resin selected from the group consisting of a styrene resin, an acrylic resin, a chlorine-containing resin, a polycarbonate resin and a thermoplastic polyester resin.

The resin laminate according to the present invention, due to the use of a specific modified ethylene/vinyl acetate copolymer resin, has a strong interlaminar adhesion strength and, when further laminated with a layer of another material, can enjoy both the properties of the material and the advantages properties inherent in the specific resins constituting the layer B, and so has a great possibility of being applicable not only to industrial products but also to articles for daily use.

DETAILED DESCRIPTION OF THE INVENTION (1) Modified ethylene/vinyl acetate copolymer resin layer—Layer A The modified ethylene/vinyl acetate copolymer forming one layer—Layer A—of the resin laminate according to the present invention is obtained by subjecting an ethylene/vinyl acetate (hereinafter EVA for short) having a vinyl acetate content of 5-50% by weight, preferably 10-35% by weight and a vinyl acetate monomer to graft polymerization conditions, and behaves as a resin having a melt flow rate (hereinafter MFR for short) of 0.5-30 g/10 min., preferably 1-10 g/10 min. and a total vinyl acetate content of 20-80% by weight, preferably 20-50% by weight.

Such a modified ethylene/vinyl acetate copolymer resin (hereinafter called the "modified EVA") should preferably be produced in the following manners.

1) Starting materials (a) Ethylene/vinyl acetate copolymer (EVA)

Used for the preparation of the modified EVA is an unmodified EVA having a vinyl acetate content of 5-50% by weight, preferably 10-35% by weight.

A vinyl acetate content less than 5% by weight is not preferred, since the amount of vinyl acetate monomers impregnated and polymerized is so limited that the properties of the resulting modified EVA become far from satisfactory. An amount exceeding 50% by weight is again not preferred, since the softening point of EVA is so low that during polymerization, particles fuse or coagulate into a lump. Preferably, the EVA should have an MFR of generally 5-400 g/10 min., esp., 10-200 g/10 min.

The amount of the vinyl acetate monomer used is determined on the basis of the total amount of vinyl acetate to be contained in the finally formed modified EVA. If the total amount of vinyl acetate is below the lower limit, then the desired object would not be achieved in view of the balance between adhesion and strength. If the total amount of vinyl acetate exceeds the upper limit, there would then be degradation of moldability.

The modified EVA may contain other polymers, inorganic fillers, stabilizers, coloring materials, etc., unless they have a serious influence upon the effect of the invention. For instance, petroleum resins or tackifiers ordinarily used for hot-melt adhesives may be employed as well.

The MFR of the modified EVA lies in the above defined range. An MFR less than the lower limit would make it difficult to form thin films, whereas an MFR exceeding the upper limit would cause a handling problem during molding, rendering it difficult to obtain homogeneous laminates.

(b) Vinyl acetate monomer

Usually, a commercially available vinyl acetate monomer may be used for preparing the modified EVA. Half or more of the vinyl acetate monomer may be substituted by some other vinyl monomer for use. The "other vinyl monomer" herein includes vinyl esters such as vinyl propionate and vinyl benzoate; unsaturated organic acids or their derivatives such as acrylic acid, ethyl acrylate, butyl acrylate, 2-ethylhexyl acrylate, methacrylic acid, methyl methacrylate, butyl methacrylate, maleic anhydride, dimethyl maleate and di(2-ethylhexyl) maleate; unsaturated aromatic monomers such as styrene and 2,5-dichlorostyrene; unsaturated nitriles such as acrylonitrile and methacrylonitrile; and unsaturated mono- or di-halides such as vinyl chloride and vinylidene chloride.

The vinyl acetate monomer is used in an amount of usually 10-50 parts by weight, preferably 15-30 parts by weight per 100 parts by weight of the ethylene/vinyl acetate copolymer. The vinyl acetate monomer may be added to the ethylene/vinyl acetate copolymer at a time or in proportions. The EVA and vinyl acetate monomer may usually be subjected to graft polymerization with the use of a radical generator; however, this is not the case with radiation reactions.

(c) Radical generator

A generally available radical generator may be used for preparing the modified EVA of Layer B. In consideration of the preferred monomer for graft reaction to be described later, the radical generator should preferably have a decomposition temperature of 50° C. or higher and be soluble in oil. By the term "decomposition temperature" is meant a temperature at which the ratio of decomposition of a radical generator reaches 50% after a solution of 0.1 mole of that generator in 1 liter of benzene has been left at that temperature for 10 hours or, to put it another way, a "decomposition temperature for obtaining a 10-hour half-life".

A problem with the use of a radical generator having a low decomposition temperature is that the polymerization of vinyl acetate monomer proceeds so abnormally that any homogeneous modified polymer cannot be obtained. However, a suitable combination of radical generators having high and low decomposition temperatures may produce decomposition in a stepwise or continuous manner, thus enabling an efficient graft reaction.

Such radical generators may include organic peroxides such as 2,4-dichlorobenzoyl peroxide, t-butyl peroxypivalate, o-methylbenzoyl peroxide, bis-3,5,5-trimethylhexanoyl peroxide, octanoyl peroxide, benzoyl peroxide, t-butyl peroxy-2-ethylhexanoate, cyclohexanone peroxide, 2,5-dimethyl-2,5-dibenzoyl peroxyhexane, t-butyl peroxybenzoate, di-t-butyl-diperoxyphthalate, methyl ethyl ketone peroxide, dicumyl peroxide and di-t-butyl peroxide; and azo compounds such as azobisisobutylonitrile and azobis (2,4 -dimethyl-valeronitrile).

Depending upon the type of radical generators and the reaction conditions involved, the amount of the radical generator used may be determined in the range of about 0.01-10% by weight with respect to the amount of the vinyl acetate monomer used. In an amount less than 0.01% by weight the reaction does not proceed smoothly, whereas in an amount exceeding 10% by weight gel is likely to be produced in the modified EVA, thus making it difficult to achieve the effect of this invention.

2) Preparation of modified EVA

The modified EVA is prepared by subjecting the respective starting materials to a graft polymerization reaction. Most preferably, it should be prepared by an aqueous suspension graft polymerization to be described just below, since gel control is easily attainable.

Thus, an aqueous suspension containing EVA particles having a vinyl acetate content of 5-50% by weight, vinyl acetate monomer and radical generator is first heated to a temperature at which the decomposition of the initiator does not substantially take place, thereby impregnating the EVA particles with the monomer until the amount of an unimpregnated free monomer is reduced to below 20% by weight. Then, the suspension is further heated to a temperature at which the polymerization of the monomer is brought to an end. This preferable technique will now be explained in greater detail.

(a) Impregnation step

According to one typical or preferable method for impregnating the EVA particles with the vinyl acetate monomer in an aqueous medium, the vinyl acetate monomer having preferably the radical generator (and, if required, other additives) dissolved in it is first added under agitation to an aqueous suspension of the EVA particles. Alternatively, the EVA particles may first be added under agitation to an aqueous suspension of the vinyl acetate monomer in which the radical generator is dissolved.

The impregnation step on an industrial scale should be efficiently effected at an elevated temperature at which the decomposition of the radical generator does not substantially take place, i.e. generally at a temperature of room temperature to 100° C., preferably 40°-60° C.

EVA is relatively well compatible with the vinyl acetate monomer. Therefore, even when less than 20% by weight, preferably less than 10% by weight of the vinyl acetate monomer remains free prior to the initiation of graft polymerization reaction, the free monomer will be impregnated into the EVA particles during polymerization. In consequence, it is most unlikely that the homopolymerization of the free vinyl monomer may proceed during the graft polymerization, yielding homopolymer particles of vinyl acetate separately from the modified EVA particles. Generally, the impregnation time may be about 2-8 hours.

The sum of amount of the EVA particles and the amount of vinyl acetate monomer in the aqueous suspension are generally in the range of about 5-100 parts by weight per 100 parts by weight of water.

Such an aqueous suspension may be maintained by merely stirring in a stably suspended and dispersed state. By using an appropriate suspension stabilizer, however, it is possible to prepare a suspension more easily and more stably. The suspension stabilizers to be used may include water-soluble high-molecular substances such as polyvinyl alcohol, methyl cellulose and hydroxycellulose; anionic surface active agents such as alkyl benzene sulfonates; nonionic surface active agents such as polyoxyethylene alkyl ethers; or water-insoluble inorganic salts such as magnesium oxide and calcium phosphate, which may be used alone or in admixture and in an amount of about 0.01-10% by weight.

Simultaneously with impregnating the EVA particles with the vinyl acetate monomer (and the radical generator, etc.), auxiliary materials such as plasticizers, lubricants and antioxidants may be impregnated into the EVA particles. It is noted in this context that such auxiliary materials may already have been added to EVA, or alternatively may be added to EVA after the graft polymerization reaction.

(b) Graft polymerization step

The thus prepared aqueous suspension is heated to at least a temperature at which the radical generator used decomposes at a suitable rate, so that the impregnated vinyl acetate monomer is graft-polymerized onto EVA to give modified EVA particles.

Preferably, the aqueous suspension should be properly stirred all the time during the progress of graft copolymerization.

The polymerization temperature should appropriately be selected from a general range of 50°-100° C., but need not be kept at a certain level throughout the graft polymerization step. At a polymerization temperature exceeding 100° C., not only are the particles likely to gelate, but they are also likely to be finely divided by stirring or otherwise coagulate into a lump.

The graft polymerization time is generally in the range of about 2-10 hours. After graft polymerization, the product may be post-treated in the same manner as is the case with the post-treatment of the aqueous suspension polymerization of ordinary vinyl monomers (e.g. styrene), thereby obtaining the modified EVA particles in which the forms of the EVA particles used remain substantially intact.

Thus, the EVA used prior to modification should preferably be in a granular form in view of the later handling at the time of molding and processing, although it may be in a powdery form.

In other words, it is usually preferred that the starting EVA be of a particle size such as to be suitable for use as a molding material, since the modified EVA product can then be used as such as a molding materials. In general, the starting EVA has a particle size of about 1-8 mm, preferably about 3-7 mm, which undergoes no substantial change by the modification.

(2) Specific thermoplastic resin layer (Layer B)

The thermoplastic resin forming another layer (Layer B) of the resin laminate according to the present invention is selected from styrene resins, acrylic resins, chlorine-containing resins, polycarbonate resins and thermoplastic polyester resins.

Usable as the styrene resins are, for example, polystyrene, impact-resistant polystyrene, a styrene/acrylonitrile copolymer, a styrene/acrylonitrile/butadiene copolymer, a styrene/methyl methacrylate copolymer, a styrene/butadiene/styrene block copolymer (SBS), a styrene/isobutylene/styrene block copolymer (SIS), hydrogenated SBS (SEBS) and hydrogenated SIS (SEPS), which may all be commercially available. Among others, preference is given to polystyrene, impact-resistant polystyrene and copolymers of styrene/acrylonitrile and styrene/acrylonitrile/butadiene.

Usable as the acrylic resins are, for example, polymethyl acrylate, polyethyl acrylate, polybutyl acrylate, poly2-ethylhexyl acrylate, polymethyl methacrylate, a methyl methacrylate/methyl acrylate copolymer, a methyl methacrylate/acrylonitrile copolymer and a methyl methacrylate/α-methylstyrene copolymer, which are all commercially available. Among others, preference is given to polymethyl methacrylate.

Usable as vinyl chloride and/or vinylidene chloride resins that are the chlorine-containing resins are, for example, polyvinyl chloride, polyvinylidene chloride, a vinyl chloride/vinylidene chloride copolymer, a vinyl chloride/vinyl acetate copolymer, a vinyl chloride/ethylene copolymer, a vinyl chloride/propylene copolymer, a vinyl chloride/acrylonitrile copolymer and a vinyl chloride/styrene copolymer, which are all commercially available. Among others, preference is given to polyvinyl chloride and a vinyl chloride/vinylidene chloride copolymer. The vinyl chloride and/or vinylidene chloride resins may be blended with other polymers, unless they have an adverse influence upon the effect of the invention. For instance, polyvinyl chloride may preferably be blended with an acrylonitrile/butadiene copolymer, since they are compatible with each other.

The polycarbonate resins usable may be those obtained by the reaction of dihydroxy compounds with phosgene or diphenyl carbonate in known manners. In particular, a polycarbonate resin obtained by using as the dihydroxy compound 4,4'-dihydroxydiphenyl-2,2'-propane(bisphenol A) is preferable, since it excels in mechanical properties and transparency.

These polycarbonate resins may be any one of commercially available products.

The thermoplastic polyester resins may be those obtained by the direct polymerization of diols with dicarboxylic acids or by the ester exchange between diols and dicarboxylates. In particular, thermoplastic polyesters comprising 1,2-ethanediol or 1,4-butanediol as a main diol component and terephthalic acid as a main dicarboxylic acid component are preferred because of their excellent heat resistance and mechanical strength. These thermoplastic polyesters may be any one of commercially available products.

The above described styrene, acrylic, chlorine-containing, polycarbonate and thermoplastic polyester resins may contain various additives such as stabilizers, coloring materials, fillers, nucleators, softeners, plasticizers and antistatics.

(3) Production of resin laminate

The resin laminate according to the present invention may be produced by forming the modified EVA and the specific thermoplastic resin into the desired form such as a sheet or film and carrying out lamination by means of known suitable techniques such as co-extrusion molding, press molding and extrusion laminating.

While the present invention has been described specifically with reference to laminates comprising the above two layers alone, it should be understood that the resin laminates of the present invention include three- or multi-layer laminates comprising the two basic layers plus other layer or layers. In the case of such multi-layer laminates, the other layer or layers used, for instance, may be made of styrene resins such as acrylonitrile/butadiene/styrene (ABS) and polystyrene resins; α-olefine resins such as polyethylene and polypropylene; various rubbers such as ethylene/propylene rubber, acrylonitrile/butadiene rubber and styrene/butadiene rubber; fluorohydrocarbon resins such as polyvinyl fluoride and polyvinylidene fluoride; metals such as aluminium and iron; thermosetting resins such as unsaturated polyester, epoxy and urethane resins; engineering plastics such as polyphenylene ethers, polyimides and polysulfones; and gas barrier resins such as saponified ethylene/vinyl acetate copolymers and polyamides.

The modified EVA resin forming one layer of the resin laminate according to the present invention can be laminated with these layers without using an adhesive.

When the modified EVA resin is laminated with the other layer, it is preferred in view of adhesion that the modified EVA contain an unsaturated carboxylic acid or its derivative or an unsaturated glycidyl compound in the form of graft or copolymer, or alternatively part of the vinyl acetate in the modified EVA be a product saponified through hydrolysis.

Such modified EVA containing the unsaturated compound may be prepared such methods as grafting the unsaturated compound onto the unmodified EVA resin simultaneously with the grafting of the vinyl acetate monomer; using as the unmodified EVA a modified EVA in which the unsaturated compound is incorporated in the form of graft or copolymer; additionally graft-copolymerizing the unsaturated compound onto the modified EVA; and kneading with the modified EVA a modified α-olefin polymer containing the unsaturated compound in the form of graft or copolymer.

The "unsaturated carboxylic acid or its derivative" herein refers to unsaturated compounds containing, e.g. carboxylic acid groups, acid anhydride groups, ester groups, metal salts of carboxylic acids and carboxylic acid amide groups, as represented by acrylic, methacrylic, maleic, fumaric and itaconic acids or their derivatives. Among these compounds, maleic anhydride is particularly preferred.

The unsaturated glycidyl compound includes glycidyl methacrylate and glycidyl acrylate.

The resin laminate according to the present invention is particularly useful, for the coating of inner surfaces of metallic pipes, in which the lamination of resins has so far been quite difficult.

EXPERIMENTAL EXAMPLES

Example 1

Preparation of modified EVA particles

Twenty (20) kg of water and 0.6 kg of tribasic calcium phosphate and 0.6 g of sodium dodecyl benzenesulfonate, both serving as suspending agents, were fed into an autoclave of 50 liters in volume to prepare an aqueous medium. Then, 7 kg of EVA particles (having an MFR of 30 g/10 min. and a vinyl acetate content of 33% by weight) were added and suspended by stirring in this aqueous medium.

Apart from this suspension, 64.5 g of t-butyl peroxypivalate and 3.6 g of benzoyl peroxide were dissolved in 3 kg of vinyl acetate. The resulting solution was then added to the suspension system, followed by bringing the internal pressure of the system up to a pressure of 0.5 kg/cm$^2$ by the introduction of nitrogen into the autoclave. Thereafter, the interior of the autoclave was heated to 50° C., at which temperature the suspension was left under agitation for 3 hours, thereby impregnating the total amount of vinyl acetate containing the polymerization initiator into the EVA particles. Subsequently, the suspension was heated to 63° C., at which temperature it was left under agitation for 8 hours to carry out polymerization. The suspension was then further heated to 70° C. and kept at that temperature for 2 hours and then heated to 80° C. and kept at that temperature for a further one hour, thereby completing polymerization.

After cooling, the solid matter was removed from the autoclave and washed with water to obtain 10 kg of the modified EVA particles.

The modified EVA particles obtained in this way were found to have an MFR of 1.0 g/10 min. and a total vinyl acetate content of 53% by weight.

Preparation of modified EVA/styrene laminate

Sheets, each of 0.5 mm in thickness, were obtained respectively from the modified EVA particles obtained above and from polystyrene (Dialex HF77 made by Mitsubishi Monsant Co., Ltd.) by compression molding at a temperature of 180° C.

The respective sheets were laminated together by compression molding at a temperature of 160° C. to obtain a modified EVA/polystyrene laminated sheet.

Measurement of adhesion strength

The laminate obtained above was cut into a rectangular strip specimen of 15 mm in width. One portion of the specimen was delaminated and the EVA and polystyrene portions were set in a chuck of an Instron type tester and tensioned at a tensile rate of 50 mm/min. to determine its interlaminar adhesion strength. The result was 760 g/15 mm.

Comparative Example 1

The procedure of Ex. 1 was followed with the exception that an EVA having a vinyl acetate content of 45% by weight (Levaprene 450 made by Bayer Co., Ltd. having an MFR of 2 g/10 min.) was used in place of the modified EVA particles, thereby producing a comparative laminate and estimating its adhesion strength. The adhesion strength was 200 g/15 mm.

Example 2

With a 35-mm bore T-die molding machine made by Praco Co., Ltd., the modified EVA particles obtained in Ex. 1 were molded into various 25 to 50-μm thick films at a molding temperature of 200° C., a resin temperature of 200° C., a screw speed of 30-55 r.p.m. and a withdrawal speed of 10 m/sec.

Then, the 50-μm thick film was overlaid on a 0.5-mm thick sheet of impact-resistant polystyrene (Denka Styrol HI-E4 made by Denki Kagaku Kogyo K.K.), followed by heat-bonding at a temperature of 180° C. and a pressure of 2 kg/cm$^2$ for 2 seconds with a heat sealer.

Subsequently, the obtained product was cut into a 15-mm wide specimen to measure its adhesion strength in the same manner as described in Ex. 1.

The adhesion strength was 1000 g/15 mm.

Comparative Example 2

T-die molding was carried out in the same manner as in Ex. 2, except that an EVA having a vinyl acetate content of 45% by weight (Levaprene 450 made by Bayer Co., Ltd.) was used in place of the modified EVA particles. However, any thin film (50 μm or below in thickness) could not be obtained due to slow cooling.

Example 3

A 0.5-mm thick polyvinyl chloride sheet and a 0.5-mm thick polystyrene sheet were heat-bonded together at a temperature of 160° C. in the same manner as in Ex. 2, while the 50-μm thick sheet of the modified EVA used in Ex. 2 was interleaved between them, thereby producing a three-layer laminate. The interlaminar adhesion strength between the EVA and polystyrene layers of this laminate was found to be 800 g/15 mm.

Example 4

Preparation of acrylic resin laminate

Sheets, each of 0.5 mm in thickness, were respectively obtained from the modified EVA particles obtained in Ex. 1 and from polymethyl methacrylate (Acrypet made by Mitsubishi Rayon Co., Ltd.) by compression molding at a temperature of 180° C.

The obtained sheets were laminated together by compression molding at a temperature of 200° C. to obtain a laminated sheet of the modified EVA and polymethyl methacrylate.

Measurement of adhesive strength

The laminate obtained above was cut into a rectangular strip specimen of 15 mm in width. One portion of the specimen was delaminated and the EVA and polymethacrylate portions were set in a chuck of an Instron type tester and tensioned at a tensile rate of 50 mm/min. to determine its interlaminar strength. The result was 1000 g/15 mm.

Comparative Example 3

The procedure of Ex. 4 was followed with the exception that an EVA having a vinyl acetate content of 45% by weight (Levaprene 450 made by Bayer Co., Ltd. having an MFR of 2 g/10 min.) was used in place of the modified EVA particles, thereby producing a comparative laminate and estimating its adhesion strength. The adhesion strength was 400 g/15 mm.

Example 5

With a 35-mm bore T-die molding machine made by Praco Co., Ltd., the modified EVA particles obtained in Ex. 1 were molded into various 25 to 50-μm thick films at a molding temperature of 200° C., a resin temperature of 200° C., a screw speed of 30–55 r.p m. and a withdrawal speed of 10 m/sec.

Then, the 50-μm thick film was overlaid on a 0.5-mm thick sheet of polymethyl methacrylate, followed by heat-bonding at a temperature of 220° C. and a pressure of 2 kg/cm² for 2 seconds with a heat sealer.

Subsequently, the obtained product was cut into a 15-mm wide specimen to measure its adhesion strength in the same manner as described in Ex. 4.

The adhesion strength was 1000 g/15 mm.

Comparative Example 4

T-die molding was carried out in the same manner as in Ex. 5, except that an EVA having a vinyl acetate content of 45% by weight (Levaprene 450 made by Bayer Co., Ltd.) was used in place of the modified EVA particles. However, any thin film (50 μm or below in thickness) could not be obtained due to slow cooling.

Example 6

A 0.5-mm thick polymethyl methacrylate sheet and a 0.5-mm thick polystyrene sheet were heat-bonded together at a temperature of 180° C. in the same manner as in Ex. 5, while the 50-μm thick sheet of the modified EVA used in Ex. 5 was interleaved between them, thereby producing a three-layer laminate. The interlaminar adhesion strength between the EVA and polystyrene layers of this laminate was found to be 800 g/15 mm.

Example 7

Preparation of chlorine-containing resin laminate

Sheets, each of 0.5 mm in thickness, were obtained respectively from the modified EVA particles obtained in Ex. 1 and from polyvinyl chloride (Vinyca Compound D-126 made by Mitsubishi Monsant Co., Ltd.) by compression molding at a temperature of 140° C.

The obtained sheets were laminated together by compression molding at a temperature of 140° C. to obtain a laminated sheet of the modified EVA and polyvinyl chloride.

Measurement of adhesion strength

The laminate obtained above was cut into a rectangular strip specimen of 15 mm in width. One portion of the specimen was delaminated and the EVA and polyvinyl chloride portions were set in a chuck of an Instron type tester and tensioned at a tensile rate of 50 mm/min. to determine its interlaminar adhesion strength. The result was 980 g/15 mm.

Comparative Example 5

The procedure of Ex. 7 was followed with the exception that an EVA having a vinyl acetate content of 45% by weight (Levaprene 450 made by Bayer Co., Ltd. having an MFR of 2 g/10 min.) was used in place of the modified EVA particles, thereby producing a comparative laminate and estimating its adhesion strength. The adhesion strength was 300 g/15 mm.

Example 8

With a 35-mm bore T-die molding machine made by Praco Co., Ltd., the modified EVA particles obtained in Ex. 1 were molded into various 25 to 50-μm thick films at a molding temperature of 200° C., a resin temperature of 200° C., a screw speed of 30–55 r.p.m. and a withdrawal speed of 10 m/sec.

Then, the 50-μm thick film was overlaid on a 0.5-mm thick sheet of vinylidene chloride resin, followed by heat-bonding at a temperature of 120° C. and a pressure of 2 kg/cm² for 2 seconds with a heat sealer.

Subsequently, the obtained product was cut into a 15-mm wide specimen to measure its adhesion strength in the same manner as described in Ex. 7.

The adhesion strength was 1400 g/15 mm.

Comparative Example 6

T-die molding was carried out in the same manner as in Ex. 8, except that an EVA having a vinyl acetate content of 45% by weight (Levaprene 450 made by Bayer Co., Ltd.) was used in place of the modified EVA particles. However, any thin film (50 μm or below in thickness) could not be obtained due to slow cooling.

Example 9

A 0.5-mm thick polyvinyl chloride sheet and a 0.5-mm thick polystyrene sheet were heat-bonded together at a temperature of 160° C. in the same manner as in Ex. 8, while the 50-μm thick sheet of the modified EVA used in Ex. 8 was interleaved between them, thereby producing a three-layer laminate. The interlaminar adhesion strength between the EVA and polyvinyl chloride layers of this laminate was found to be 800 g/15 mm.

Example 10

Preparation of polycarbonate resin laminate

Sheets, each of 0.5 mm in thickness, were obtained respectively from the modified polymer particles obtained in Ex. 1 and from polycarbonate (Eupylon E-200 made by Mitsubishi Gas Chemical Company, Inc.) by compression molding at a temperature of 270° C.

The obtained sheets were laminated together by compression molding at a temperature of 240° C. to obtain a laminated sheet of the modified EVA and polycarbonate.

Measurement of adhesion strength

The laminate obtained above was cut into a rectangular strip specimen of 15 mm in width. One portion of the specimen was delaminated and the EVA and polycarbonate portion were set in a chuck of an Instron type tester and tensioned at a tensile rate of 50 mm/min. to determine its interlaminar adhesion strength. The adhesion strength was 1800 g 15 mm.

Comparative Example 7

The procedure of Ex. 10 was followed with the exception that an EVA having a vinyl acetate content of 45% by weight (Levaprene 450 made by Bayer Co., Ltd. having an MFR of 2 g/10 min.) was used in place of the modified EVA particles, thereby producing a comparative laminate and estimating its adhesion strength. The adhesion strength was 800 g/15 mm.

Example 11

With a 35-mm bore T-die molding machine made by Praco Co., Ltd., the modified EVA particles obtained in Ex. 1 were molded into various 25 to 50-μm thick films at a molding temperature of 200° C., a resin temperature of 200° C., a screw speed of 30-55 r.p.m. and a withdrawal speed of 10 m/sec.

For the purpose of comparison, T-die molding was carried out in the same way as above using an EVA having a vinyl acetate content of 45% by weight (Levaprene 450 made by Bayer Co., Ltd. and having an MFR of 2 g/10 min.). However, any thin film (50 μm or below in thickness) could not be obtained due to slow cooling.

Then, the 50-μm thick film obtained above was overlaid on an 0.5-mm thick sheet of polycarbonate (Eupylon E-200 made by Mitsubishi Gas Chemical Company, Inc ), followed by heat-bonding at a temperature of 200° C. and a pressure of 2 kg/cm² for 2 seconds with a heat sealer.

Subsequently, the obtained product was cut into a 15-mm wide specimen to measure its adhesion strength in the same manner as described in Ex. 10.

The adhesion strength was 1400 g/15 mm.

Example 12

A 0.5-mm thick sheet of polycarbonate (Eupylon E-200 made by Mitsubishi Gas Chemical Company, Inc.) and a 0.5-mm thick sheet of impact-resistant polystyrene (Styrol HI-E4 made by Denki Kagaku Kogyo K.K.) were heat-bonded together at a temperature of 240° C. in the same manner as in Ex. 11, while the 50-μm thick sheet of the modified EVA used in Ex. 11 was interleaved between them, thereby producing a three-layer laminate. The interlaminar adhesion strength between the modified EVA and impact-resistant polystyrene layers of this laminate was found to be 1200 g/15 mm.

Example 13

Preparation of thermoplastic polyester resin laminate

Sheets, each of 0.5 mm in thickness, were obtained respectively from the modified EVA particles obtained in Ex. 1 and from thermoplastic polyester (Dianite PA500X made by Mitsubishi Rayon Co., Ltd.).

The obtained sheets were laminated together by compression molding at a temperature of 230° C. to obtain a laminated sheet of the modified EVA and thermoplastic polyester.

Measurement of adhesion strength

This laminate was cut into a rectangular strip specimen of 15 mm in width. One portion of the specimen was delaminated and the EVA and thermoplastic polyester portions were set in a chuck of an Instron type tester and tensioned at a tensile rate of 50 mm/min. to determine its interlaminar adhesion strength. The result was 1500 g/15 mm.

Comparative Example 8

The procedure of Ex. 13 was followed with the exception that an EVA having a vinyl acetate content of 45% by weight (Levaprene 450 made by Bayer Co., Ltd. and having an MFR of 2 g/10 min.) was used in place of the modified EVA particles, thereby producing a comparative laminate and estimating its adhesion strength. The adhesion strength was 800 g/15 mm.

Example 14

With a 35-mm bore T-die molding machine made by Praco Co., Ltd., the modified EVA particles obtained in Ex. 1 were molded into various 25 to 50-μm thick films at a molding temperature of 200° C., a resin temperature of 200° C., a screw speed of 30-55 r.p.m. and a withdrawl speed of 10 m/sec.

For the purpose of comparison, T-die molding was carried out in the same manner as above using an EVA having a vinyl acetate content of 45% by weight Levaprene 450 made by Bayer Co., Ltd. and having an MFR of 2 g/10 min.). However, any thin film (50 μm or below in thickness) could not be obtained due to slow cooling.

Then, the 50-μm thick film obtained above was overlaid on a 0.5-mm thick sheet of thermoplastic polyester (Dianite PA500X made by Mitsubishi Rayon, Co., Ltd.), followed by heat-bonding at a temperature of 230° C. and a pressure of 2 kg/cm² for 2 seconds with a heat sealer.

Subsequently, the obtained product was cut into a 15-mm wide specimen to measure its adhesion strength in the same manner as described in Ex. 13.

The adhesion strength was 1500 g/15 mm.

Example 15

A 0.5-mm thick sheet of thermoplastic polyester (Dianite PA500X made by Mitsubishi Rayon Co., Ltd.) and a 0.5-mm thick sheet of impact-resistant polystyrene (Styrol HI-E4 made by Denki Kagaku Kogyo K.K.) were heat-bonded together at a temperature of 230° C. in the same manner as in Ex. 14, while the 50-μm thick sheet of the modified EVA used in Ex. 14 was interleaved between them, thereby producing a three-layer laminate. The interlaminar adhesion strength between the modified EVA and impact-resistant polystyrene layers of this laminate was found to be 1200 g/15 mm.

What is claimed is:

1. A resin laminate comprising:
    a layer (Layer A) of a modified ethylene/vinyl acetate copolymer resin obtained by the graft copolymerization of a vinyl acetate monomer onto an ethylene/vinyl acetate copolymer having a vinyl acetate content of 5-50% by weight, said modified ethylene/vinyl acetate copolymer resin having an MFR of 0.5 to 30 g/10 min. and a total vinyl acetate content of 20-80% by weight; and a layer (Layer B) of at least one thermoplastic resin selected from the group consisting of a styrene resin, an acrylic resin, a chlorine-containing resin, a polycarbonate resin and a thermoplastic polyester resin.

2. A resin laminate comprising:

a layer (Layer A) of a modified ethylene/vinyl acetate copolymer resin obtained by the graft copolymerization of a vinyl acetate monomer onto a ethylene/vinyl acetate copolymer having a vinyl acetate content of 5-50% by weight, said modified ethylene/vinyl acetate copolymer resin having an MFR of 0.5 to 30 g/10 min. and a total vinyl acetate content of 20-80% by weight; and a layer (Layer B) of at least one thermoplastic resin selected from the group consisting of a styrene resin, an acrylic resin, chlorine-containing resin, a polycarbonate resin and a thermoplastic polyester resin, wherein the modified ethylene/vinyl acetate copolymer resin is obtained by heating an aqueous suspension containing ethylene/vinyl acetate copolymer particles having a vinyl acetate content of 5-50% by weight, a vinyl acetate monomer and a radical generator to a temperature at which the decomposition of said radical generator does not substantially take place, thereby impregnating said ethylene/vinyl acetate copolymer particles with said vinyl acetate monomer and, then, heating said aqueous suspension to a higher temperature thereby to complete graft polymerization.

3. The resin laminate according to claim 2, wherein the radical generator has a decomposition temperature of 50° C. or higher.

4. The resin laminate according to claim 2, wherein the temperature at which the decomposition of said radical generator does not substantially take place is 40°-60° C.

5. The resin laminate according to claim 2, wherein said higher temperature is 50°-100° C.

6. The resin laminate according to claim 2, wherein the ethylene/vinyl acetate copolymer particles have a particle size of about 3-7 mm.

7. The resin laminate according to claim 2, wherein the layer (Layer A) of the modified ethylene/vinyl acetate copolymer resin constitutes an adhesive layer for the layer (Layer B) of the thermoplastic resin and a layer of another material is selected from styrene resins, olefin resins, rubbers, fluorohydrocarbon resins, metals, thermosetting resins, engineering plastics and gas barrier resin.

8. The resin laminate according to claim 7, wherein the modified ethylene/vinyl acetate copolymer resin contains an unsaturated carboxylic acid or its derivative or an unsaturated glycidyl compound in the form of graft or copolymer.

9. The resin laminate according to claim 7, wherein a part of the vinyl acetate in the modified ethylene/vinyl acetate copolymer resin has been saponified.

* * * * *